(12) United States Patent
Nakano (10) Patent No.: US 9,208,143 B2
(45) Date of Patent: Dec. 8, 2015

(54) ELECTRONIC DEVICE AND DICTIONARY DATA DISPLAY METHOD

(75) Inventor: Yukihiro Nakano, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 482 days.

(21) Appl. No.: 13/617,271

(22) Filed: Sep. 14, 2012

(65) Prior Publication Data

US 2013/0090919 A1 Apr. 11, 2013

(30) Foreign Application Priority Data

Oct. 11, 2011 (JP) ................................ 2011-224083

(51) Int. Cl.
*G06F 17/27* (2006.01)

(52) U.S. Cl.
CPC .......... *G06F 17/2735* (2013.01); *G06F 17/273* (2013.01); *G06F 17/276* (2013.01); *G06F 17/277* (2013.01)

(58) Field of Classification Search
CPC ........................ G06F 17/273; G06F 17/2735
USPC .................... 715/259–260; 704/10
See application file for complete search history.

(56) References Cited

U.S. PATENT DOCUMENTS

| | | | | |
|---|---|---|---|---|
| 5,754,972 | A * | 5/1998 | Baker et al. | 704/200 |
| 6,091,415 | A * | 7/2000 | Chang et al. | 715/809 |
| 6,961,722 | B1 * | 11/2005 | Bruecken | 1/1 |
| 2003/0118973 | A1 * | 6/2003 | Noble | 434/167 |
| 2003/0145285 | A1 * | 7/2003 | Miyahira et al. | 715/533 |
| 2003/0231874 | A1 * | 12/2003 | Hur et al. | 386/125 |
| 2004/0267537 | A1 * | 12/2004 | Nakamura et al. | 704/276 |
| 2007/0026375 | A1 * | 2/2007 | Dewey | 434/350 |
| 2007/0260451 | A1 * | 11/2007 | Yanagisawa | 704/10 |
| 2008/0172226 | A1 * | 7/2008 | Abe et al. | 704/235 |
| 2010/0235723 | A1 * | 9/2010 | Nakajima | 715/205 |
| 2013/0090919 | A1 * | 4/2013 | Nakano | 704/9 |

FOREIGN PATENT DOCUMENTS

| | | |
|---|---|---|
| JP | 2004-206538 A | 7/2004 |
| JP | 2007094547 A | 4/2007 |

OTHER PUBLICATIONS

Japanese Office Action (and English translation thereof) dated May 26, 2015, issued in counterpart Japanese Application No. 2011-224083.

* cited by examiner

*Primary Examiner* — Samuel G Neway
(74) *Attorney, Agent, or Firm* — Holtz, Holtz, Goodman & Chick PC (57) ABSTRACT

An electronic device includes a display module and a dictionary storage module which stores dictionary data that causes a plurality of entry words including compound words obtained by connecting a plurality of words to correspond to explanatory information on the entry words. When the user retrieves a dictionary, entry words for compound words are retrieved from the entry words in the dictionary storage module and words common to the retrieved compound words are listed and displayed on the display module. Entry words for compound words connecting with a word specified by a user operation in the displayed list are read from the dictionary data and displayed in list form on the display module.

16 Claims, 5 Drawing Sheets

ELECTRONIC DEVICE AND DICTIONARY DATA DISPLAY METHOD

CROSS-REFERENCE TO RELATED APPLICATIONS

This application is based upon and claims the benefit of priority from prior Japanese Patent Application No. 2011-224083, filed Oct. 11, 2011, the entire contents of which are incorporated herein by reference.

BACKGROUND OF THE INVENTION

1. Field of the Invention

Embodiments described herein relate generally to an electronic device with a dictionary function suitable for searching for, for example, German compound words and a dictionary data display method.

2. Description of the Related Art

When a desired word or phrase is searched for on a conventional electronic dictionary device, the characters of a word or phrase to be searched for (or the search characters) are key-input or handwritten sequentially, starting with a first character. Then, each time a search character is input, entry words of dictionary data prefix-matching the input character string are retrieved and displayed in list form.

This makes it possible to retrieve entry words corresponding to the desired word or phrase even if all the characters constituting the desired word or phrase are not input to the last.

German has compound words of combinations of two or more words, such as a compound noun obtained by combining different nouns into a word. A compound word is composed of two elements, a prescriptive word in the front part and a base word in the rear part. Therefore, a compound word includes many letters. For example, when the compound word "buildungsfernsehen" (educational television) obtained by combining the prescriptive word "bildungs" (education) with the base word "fernsehen" (television) is retrieved, this causes the problem of not only involving a lot of trouble in inputting letters but also increasing the possibility that the compound word will be misspelled.

A conventional electronic dictionary device has been considered as disclosed in Jpn. Pat. Appln. KOKAI Publication No. 2004-206538 as follows. With the disclosed electronic dictionary device, when an entry word that coincides with a compound word input as a search word has not been retrieved, the compound word is separated into a prescriptive word part and a base word part. A piece of explanatory information corresponding to an entry word for each of the separated word parts is read from dictionary data and displayed side by side, thereby enabling the contents of the compound word to be understood.

There is no conventional dictionary device with the function of retrieving an entry word by inputting a compound word by a method differing from normal entry word retrieval. With a conventional dictionary device, it is particularly impossible to input a compound word with many letters easily and correctly.

BRIEF SUMMARY OF THE INVENTION

It is an object of the invention to provide not only an electronic device with a dictionary function that enables a compound word to be retrieved easily by inputting a search string even if the compound word includes many characters but also a dictionary data display method.

According to one embodiment, there is provided an electronic device comprising:

a display module;

a dictionary storage module which stores dictionary data that causes a plurality of entry words including compound words obtained by connecting a plurality of words to correspond to explanatory information on the entry words;

a common word list display module which retrieves entry words for compound words from the entry words in the dictionary storage module, lists words common to the retrieved compound words, and displays the listed words on the display module;

a compound word list display module which reads, from the dictionary data, entry words for compound words connecting with a word specified by a user operation in a list displayed on the common word list display module and displays the entry words for the compound words in list form on the display module; and an explanatory information display module which reads a corresponding piece of explanatory information from the dictionary data when a compound word has been specified according to a user operation in a compound word list displayed on the compound word list display module and displays the corresponding piece of explanatory information.

According to one embodiment, there is provided a dictionary data display method in an electronic device which includes a display module and a dictionary storage module that stores dictionary data that causes a plurality of entry words including compound words obtained by connecting a plurality of words to correspond to explanatory information on the entry words, the dictionary data display method comprising:

retrieving entry words for compound words from the entry words in the dictionary storage module, listing words common to the retrieved compound words, and displaying the listed words on the display module;

reading, from the dictionary data, entry words for compound words connecting with a word specified by a user operation in a list displayed on the display module and displaying the entry words for the compound words in list form on the display module; and reading a corresponding piece of explanatory information from the dictionary data when a compound word has been specified according to a user operation in a compound word list displayed on the display module and displaying the corresponding piece of explanatory information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given serve to explain the principles of the invention.

DETAILED DESCRIPTION OF THE INVENTION

Hereinafter, referring to the accompanying drawings, an embodiment of the invention will be explained.

Figure 1:
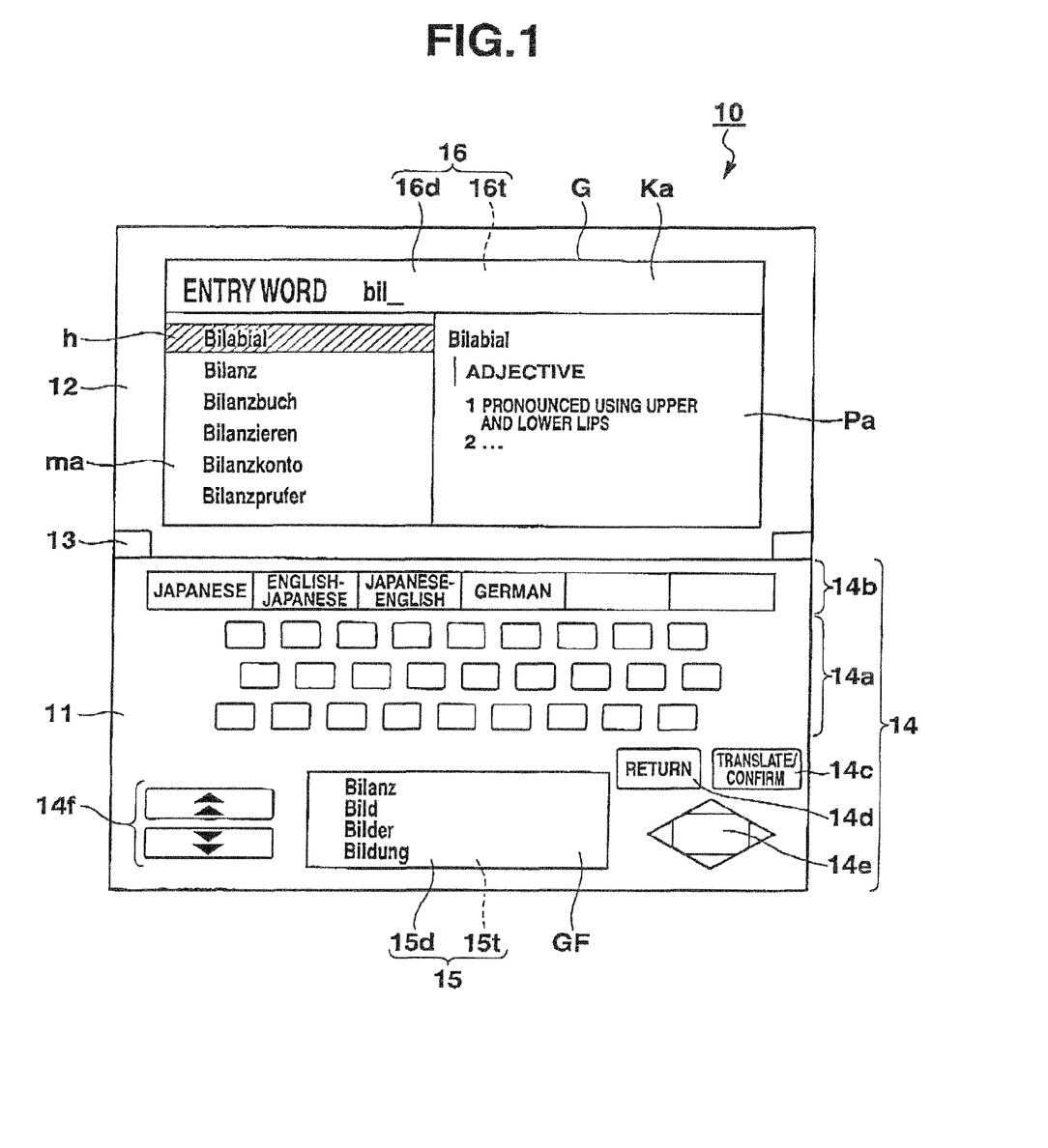
FIG. 1 is a front view showing an outer configuration of an electronic dictionary device 10 according to an embodiment of an electronic device with a dictionary function of the invention.

FIG. 1 is a front view showing an outer configuration of an electronic dictionary device 10 according to an embodiment of an electronic device with a dictionary function of the invention.

The electronic dictionary device 10 is configured as a portable device dedicated to an electronic dictionary explained below or as a personal digital assistant (PDA), a personal computer (PC), a mobile phone, an electronic book, a portable video game machine, or the like each of which has a dictionary function.

The electronic dictionary device 10 is so configured that a body case 11 and a cover case 12 are coupled with each other via a hinge part 13 so as to form a foldable case that can be opened and closed. At the surface of the body case 11 with the foldable case opened, there are provided a key input module (QWERTY keyboard) 14 and an auxiliary display module 15 with a touch-panel. The key input module 14 comprises character input keys 14a, dictionary specify keys 14b, [Translate/Confirm] key 14c, [Return] key 14d, cursor keys 14e, page feed keys 14f.

The auxiliary display module 15 has a structure where a touch position detection device that detects a position touched by the user with a stylus, a finger, or the like and a display device are integrally formed. The auxiliary display module 15 is so configured that, for example, a transparent touch-panel 15t is laid on a 256×64 dot matrix color liquid-crystal display screen 15d on the front side of the central part of the key input module 14. If needed, the auxiliary display module 15 is switched between a handwriting character input area for inputting a handwriting character, a key input area for various functions, an area where these input areas are mixed, and a prescriptive word list area for displaying prescriptive words of compound words retrieved from a dictionary in list form.

A trace of handwriting input in the handwriting character input area switched on the auxiliary display module 15 is echoed back to the color liquid-crystal display screen 15d, which displays the trace.

At the surface of the cover case 12, for example, a 480×320 dot matrix main display module 16 with a touch-panel is provided on almost all the surface. Like the auxiliary display module 15, the main display module 16 has a structure where a display device and a touch position detection device that detects a position touched by the user with a stylus, a finger, or the like are integrally formed. The main display module 16 is so configured that a transparent touch-paneltouch-panel 16t is laid on a backlight color liquid-crystal display screen 16d.

The electronic dictionary device 10 has the function of displaying an entry word retrieved according to a user operation in an entry word list area ma of the main display module 16 (dictionary retrieval screen G) and, in parallel with this, retrieving compound words, and displaying a list of prescriptive words included in each of the retrieved compound words in a prescriptive word list screen GF of the auxiliary display module 15.

In addition, the electronic dictionary device 10 has the function of displaying compound words including a specified prescriptive word in the entry word list area ma of the main display module 16 when a prescriptive word displayed on the prescriptive word list screen GF has been specified according to a user operation.

Figure 2:
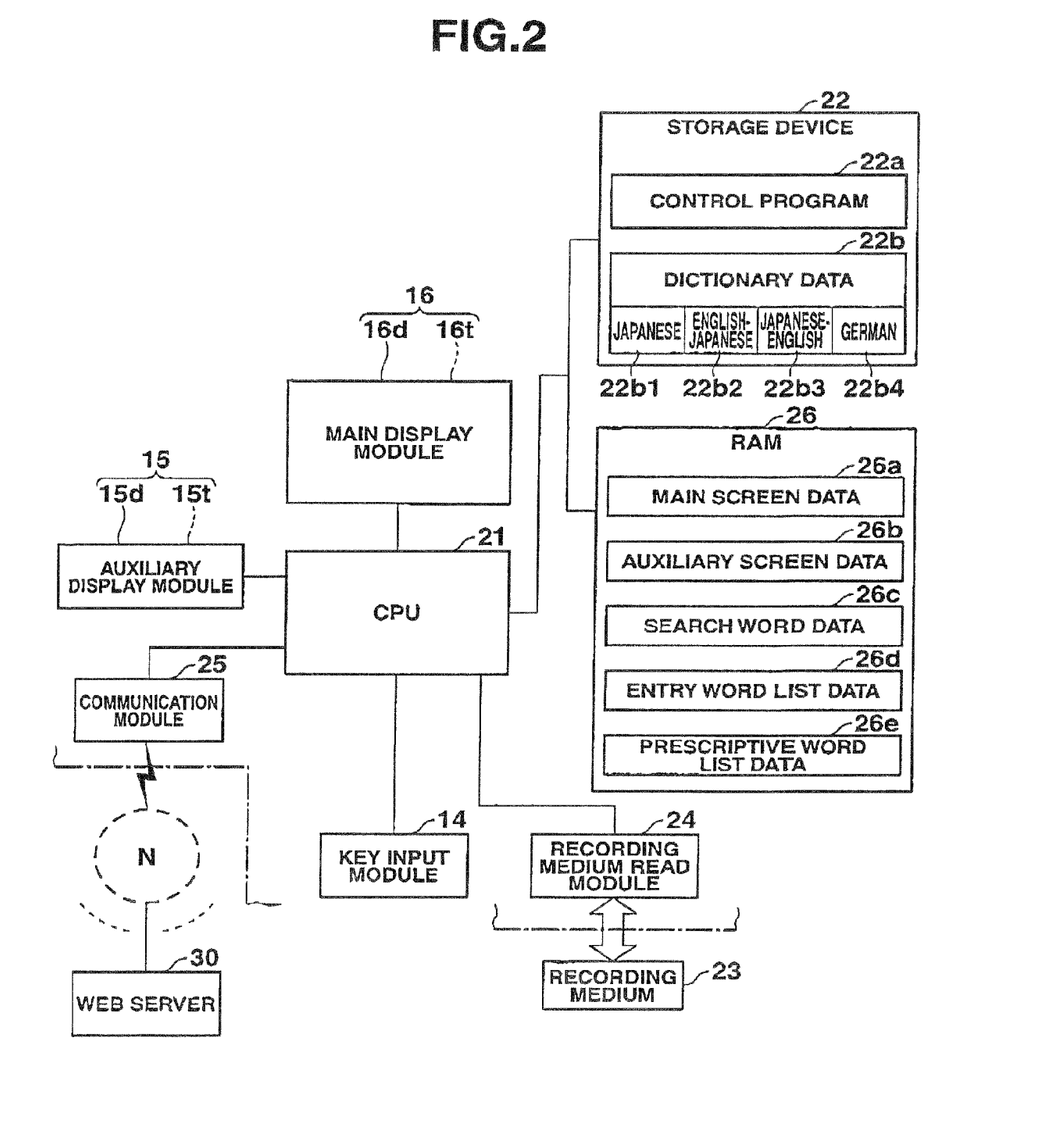
FIG. 2 is a block diagram showing a configuration of the electronic circuitry of the electronic dictionary device 10.

FIG. 2 is a block diagram showing a configuration of the electronic circuitry of the electronic dictionary device 10.

The electronic dictionary device 10 is composed of a computer which is controlled by a program. The electronic circuitry of the device 10 comprises a central processing unit (CPU) 21.

The CPU 21 controls the operation of each of the various parts of the circuitry using a RAM 26 as a work memory according to a device control program 22a prestored in a storage device 22. The device control program 22a may be loaded into the storage device 22 from an external recording medium 23, such as a ROM card, via a recording medium read module 24, or from a Web server (in this case, a program server) 30 on the Internet N via a communication module 25.

The device control program 22a stored in the storage device 22 is activated in response to an input signal corresponding to a user operation from the key input module 14, auxiliary display module 15, or main display module 16 or a communication signal from each Web server 30 on the Internet N connected via the communication module 25.

Connected to the CPU 21 are the storage device 22, recording medium read module 24, communication module 25, RAM 26, key input module 14, auxiliary display module 15, and main display module 16.

Stored as the device control programs 22a in the storage device 22 are a system program that supervises the operation of the entire electronic dictionary device 10 and a communication program for performing data communication with each Web server 30 or a user personal computer (PC) (not shown) on the Internet N via the communication module 25. Further stored as the device control program 22a is a dictionary search program for controlling search and display processes in general based on a dictionary database 22b stored in the storage device 22. The dictionary search program performs the process of inputting a search word, the process of retrieving an entry word corresponding to a search word, the process of displaying retrieved entry words in list form, the process of retrieving compound words based on retrieved words, the process of displaying a list of prescriptive words based on retrieved compound words, the process of reading and displaying various pieces of explanatory information, including translations and semantic contents corresponding to an entry word specified by the cursor, and the like.

For example, in the dictionary database 22b, not only [Japanese-language dictionary] 22b1 where Japanese explanatory information has been written so as to correspond to a Japanese entry word, [English-Japanese dictionary] 22b2 where Japanese explanatory information has been written so as to correspond to an English entry word, [Japanese-English dictionary] 22b3 where English explanatory information has been written so as to correspond to a Japanese entry word, and [German-language dictionary] 22b4 where Japanese explanatory information has been written so as to correspond to a German entry word but also a plurality of types of dictionary data have been previously stored or downloaded and stored. Entry words in a German-language dictionary include compound words. A compound word is obtained by connecting a plurality of words. A compound word is composed of two elements, a prescriptive word in the front part and a base word in the rear part. Since entry words in a dictionary are arranged in alphabetical order, compound words whose common word is a prescriptive word are stored consecutively.

In the RAM 26, a main screen data memory 26a, an auxiliary screen data memory 26b, a search word data memory 26c, an entry word list data memory 26d, a prescriptive word list data memory 26e, and the like are secured.

In the main screen data memory 26a, display data to be displayed on the main display module 16 is developed into a bitmap pattern and stored.

In the auxiliary screen data memory 26b, display data to be displayed on the auxiliary display module 15 is developed into a bitmap pattern and stored.

In the search word data memory 26c, character data sequentially input by the user as search targets in a search word input area ka of the dictionary retrieval screen G are stored.

In the entry word list data memory 26d, entry words prefix-matching character (string) data on a search word stored in the search word data memory 26c are retrieved from the dictionary database 22b and stored in list form.

In the prescriptive word list data memory 26e, compound words that have a prescriptive word coinciding with an entry word stored in the entry word list data memory 26d are retrieved from the dictionary database 22b and prescriptive words included in the retrieved compound words are stored in list form. Only one prescriptive word included equally in a plurality of compounds is stored.

In the electronic dictionary device 10 configured as described above, the CPU 21 controls the operation of each part of the circuit according to instructions written in the device control program 22a so as to cause software and hardware to operate in cooperation with each other, thereby realizing functions described below.

Next, the operation of the electronic dictionary device 10 with the above configuration will be explained.

Figure 3:
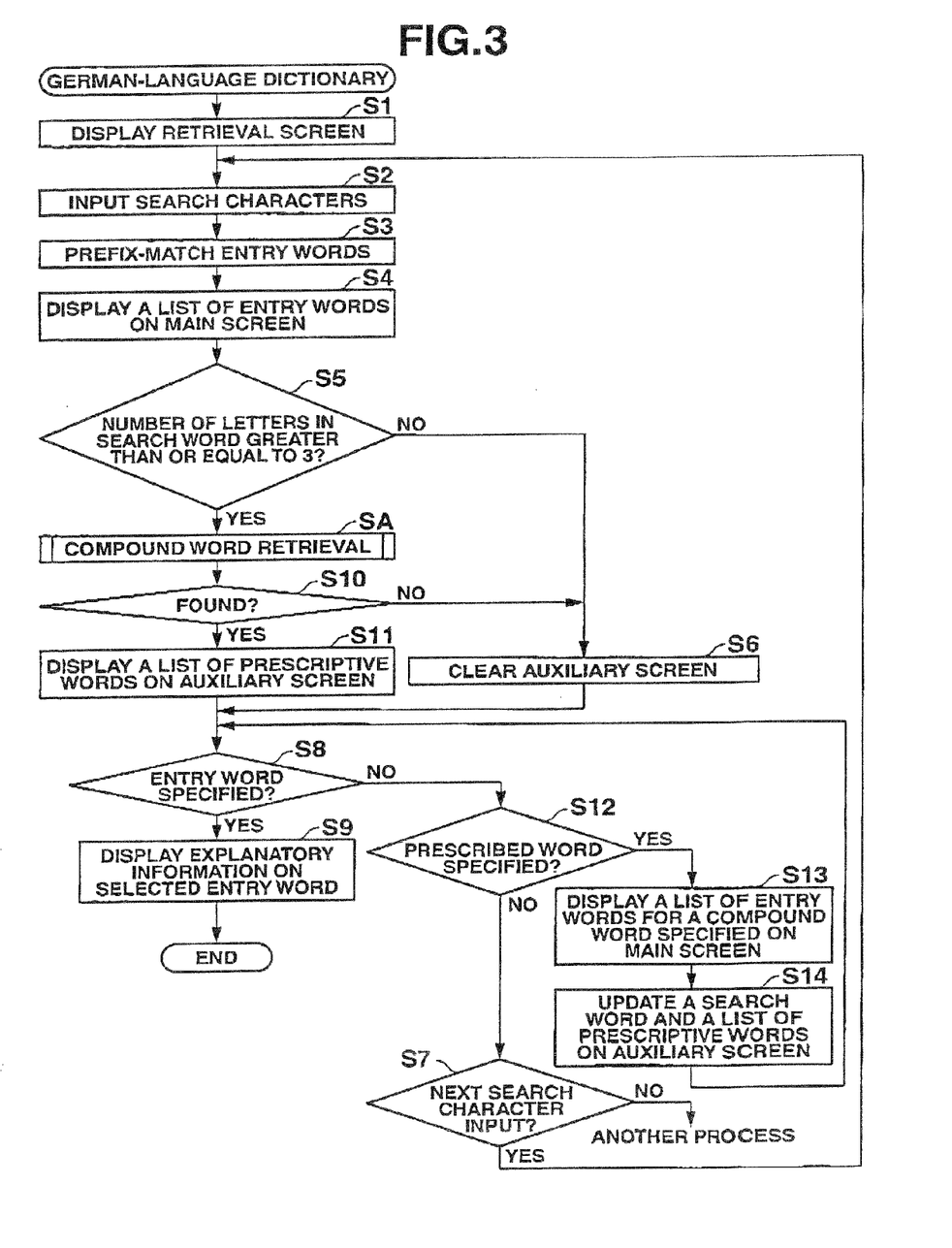
FIG. 3 is a flowchart to explain a German-language dictionary retrieval process of the electronic dictionary device 10.

FIG. 3 is a flowchart to explain a German-language dictionary retrieval process of the electronic dictionary device 10.

Figure 4:
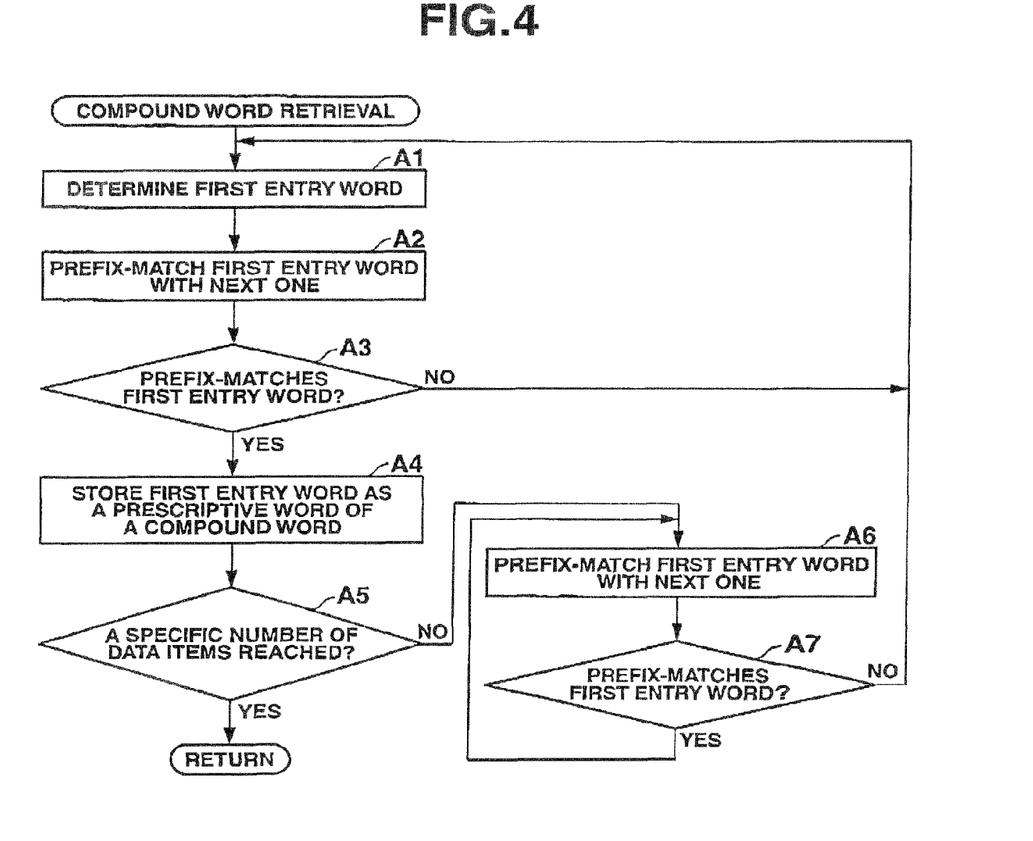
FIG. 4 is a flowchart to explain a compound word retrieval process associated with the German-language dictionary retrieval process of the electronic dictionary device 10.

FIG. 4 is a flowchart to explain a compound word retrieval process associated with the German-language dictionary retrieval process of the electronic dictionary device 10.

Figure 5:
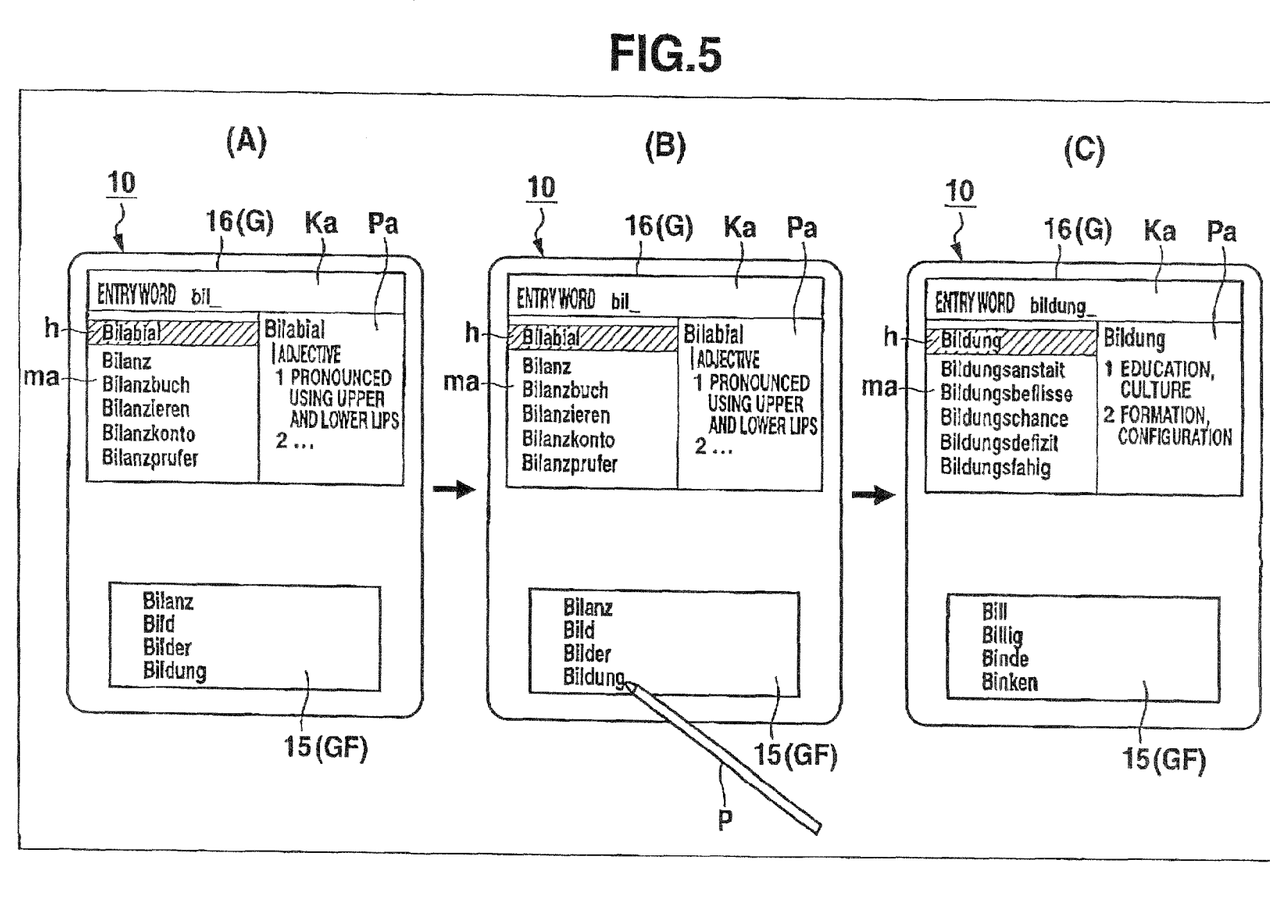
FIG. 5 shows display operations of a touch-panel main display module 16 and an auxiliary display module 15 associated with the German-language dictionary retrieval process of the electronic dictionary device 10.

FIG. 5 shows display operations of the main display module 16 and the auxiliary display module 15 associated with the German-language dictionary retrieval process of the electronic dictionary device 10.

When [German-language dictionary] 22b4 has been specified according to a user operation on the dictionary specify keys 14b, a dictionary retrieval screen G is displayed on the main display module 16 as shown in FIG. 5(A) (step S1).

Here, when a search word has been input character by character according to a user operation on the character input keys 14a (step S2), an entry word prefix-matching the input search word is retrieved from [German-language dictionary] 22b4 (step S3) and a list of retrieved entry words is displayed in the entry word list area ma of the dictionary retrieval screen G (step S4).

For example, when "b," "i," "l" have been input one by one, "bil" is displayed in the search word input area ka of the dictionary retrieval screen G (step S2). Each time one letter is input, an entry word prefix-matching the input search word is retrieved from [German-language dictionary] 22b4 (step S3). Then, when the three letters have been input, a list of retrieved entry words, "Bilabial," "Bilanz," . . . , are displayed in the entry word list area ma of the dictionary retrieval screen G (step S4).

At this time, it is determined whether the number of letters in the search word input and stored in the search word data memory 26c is greater than or equal to three (step S5). If it has been determined that the number is smaller than three (No in step S5), the auxiliary screen data memory 26b is cleared and the auxiliary display module 15 displays nothing (step S6).

Thereafter, each time a letter in the search word has been additionally input (step S7 (Yes)←S2), an entry word prefix-matching the input search word is retrieved each time (step S3) and the list of entry words in the entry word list area ma is updated (steps S2 to S4).

When an arbitrary entry word has been specified in the list of entry words displayed in the entry word list area ma by a stylus touch operation or a cursor operation and [Translate/Confirm] key 14c has been pressed (Yes in step S8), explanatory information on the specified entry word is displayed in a full screen area of the main display module 16 (step S9).

If it has been determined in step S5 that the number of letters in the input search word is greater than or equal to three (Yes in step S5), control proceeds to a compound word retrieval process shown in FIG. 4 (step SA). The reason why three letters are used as a criterion of determination is that two letters include many words representing abbreviations or the like and therefore many unnecessary words might be detected if the following compound word retrieval process is performed on the basis of two letters. Although not less than three letters is a requisite in the embodiment, this may be eliminated.

In the compound word retrieval process, first, the beginning entry word ("Bilabial" in this case) in the entry word list stored in the entry word list data memory 26d is determined to be a first entry word (step A1).

Then, the determined first entry word "Bilabial" is compared with the next entry word ("Bilanz" in this case) stored in the entry word list data memory 26d to see if the former prefix-matches the latter (step A2). That is, the comparison is made to see if the next entry word is a compound word that includes the first entry word as a prescriptive word.

If it has been determined that the first entry word "Bilabial" does not prefix-match the next entry word "Bilanz" (No in step A3), the next entry word "Bilanz" is determined to be the first entry word (step A1).

Then, the determined first entry word "Bilanz" is compared with the next entry word "Bilanzbuch" to see if the former prefix-matches the latter (step A2). If it has been determined that the next entry word "Bilanzbuch" prefix-matches the first entry word "Bilanz" (Yes in step A3), the first entry word "Bilanz" is regarded as a prescriptive word of the compound word "Bilanzbuch" and stored in a prescriptive word list data memory 26e (step A4).

Then, it is determined whether the number of prescriptive words stored in the prescriptive word list data memory 26e has reached a specific number (step A5). If it has been determined that the number has not reached the specific number (No in step A5), the first entry word "Bilanz" extracted as the prescriptive word is compared with the entry word after the next "Bilanzieren" to see if the former prefix-matches the latter, that is, to see if the next entry word is also a compound word that includes the first entry word as a common prescriptive word (steps A6, A7).

Here, if it has been determined that the first entry word "Bilanz" further prefix-matches the next entry word "Bilanzieren" (step A6) and the next entry word "Bilanzieren" is also determined to be a compound word that includes the first entry word "Bilanz" as a common prescriptive word (Yes in step A7), the process of comparing the first entry word "Bilanz" with the entry word after the next "Bilanzkont" to see if the former prefix-matching the latter is repeated, thereby retrieving sequentially all the compound words that include the first entry word "Bilanz" as a common prescriptive word (steps A6, A7).

Thereafter, if it has been determined in step A7 that the first entry word "Bilanz" stored as the common prescriptive word in the prescriptive word list data memory 26e does not prefix-match the next entry word (No in step A7), the next entry word is newly determined to be the first entry word (step A1).

Then, whether the entry word after the next is a compound word that includes the newly determined entry word as a prescriptive word is determined similarly by the process of comparing the determined entry word with the next entry word to see if the former prefix-matches the latter (steps A2, A3).

That is, in the compound word retrieval process (steps A1 to A7), when a search word has been input to display a list of entry words, entry words for compound words that include each of the entry words in the list as a prescriptive word are retrieved sequentially, starting with the first entry word. Each time a compound word is retrieved, an entry word serving as a prescriptive word is stored in the prescriptive word list data memory 26e.

When the search word "bil" has been input in this way, compound words are determined, starting with the prefix-matching entry word "Bilabial" and forward, and the prescriptive words "Bilanz," "Bild," "Bilder," . . . are extracted and stored in the prescriptive word list data memory 26e.

After this, if it has been determined that the number of prescriptive words stored in the prescriptive word list data memory 26e has reached a specific number (Yes in step A5), the compound word retrieval process shown in FIG. 4 is terminated and control returns to the main routine of the German-language dictionary retrieval process shown in FIG. 3.

Then, the prescriptive words "Bilanz," "Bild," "Bilder," . . . stored in the prescriptive word list data memory 26e are read and displayed as a prescriptive word list screen GF for compound words on the auxiliary display module 15 as shown in FIG. 5(A) (steps S10, S11).

As a result, even when retrieving the compound word "Bildungsfernsehen" (educational television) composed of a long character string, the user can extract and display prescriptive words of the compound word in list form by just inputting the first several letters and quickly find the prescriptive word parts of the search word (compound word).

Then, when "Bildung" in the prescriptive word list displayed on the auxiliary display module 15 has been touched with a stylus P (Yes in step S12) as shown in FIG. 5(B), "Bildung" is input directly to the search word input area ka of the main display module 16 as shown in FIG. 5(C). With "Bildung" in the lead, entry words for compound words including "Bildung," "Bildungsanstalt," "Bildungsbeflisse," "Bildungschance," . . . are read from [German-language dictionary] 22b4 and displayed in the entry word list area ma in list form (step S13).

At this time, the prescriptive words "Bill," "Billig," "Binde," . . . following "Bildung" specified by being touched with the stylus P are read from the prescriptive words retrieved by the compound word retrieval process (step SA) and stored in the prescriptive word list data memory 26e to the prescriptive word list screen GF of the auxiliary display module 15 and then the contents of the display are updated (step S14).

In a list of entry words for compound words displayed in the entry word list area ma of the dictionary retrieval screen G, an entry word, a desired search word, for example, "Bildungsbeflisse" has been specified by being touched with the stylus P and [Translate/Confirm] key 14c has been pressed (Yes in step S8), explanatory information on "Bildungsbeflisse" is read from [German-language dictionary] 22b4 and displayed in a full screen area of the main display module 16 (step S9).

Therefore, even when a search word desired by the user is a compound word with a long character string, the user can display only prescriptive words prefix-matching an input search character string in list form on the auxiliary display 15 (prescriptive word list screen GF) by just inputting the first several characters of the search word. The user further can specify a prescriptive word of a desired search word (compound word) in the displayed prescriptive word list to display only entry words for compound words that include the same prescriptive word on the main display module 16 (entry word list area ma) in list form.

Accordingly, even if a compound word includes many characters, the compound word can be retrieved easily by inputting its search character string.

The methods of the individual processes performed by the electronic dictionary device 10, including the German-language dictionary retrieval process shown in the flowchart of FIG. 3 and the compound word retrieval process associated with the German-language retrieval process shown in the flowchart of FIG. 4, and the dictionary database 22b including [German-language dictionary] 22b4 written in the embodiment can be stored in external recording media 23, such as a memory card (for example, a ROM card or a RAM card), a magnetic disk (for example, a floppy disk or a hard disk), an optical disk (for example, a CD-ROM or a DVD), or a semiconductor memory, in the form of programs the computer can execute. Then, the media 23 can be delivered. The computer of an electronic device with a main display module 16 and an auxiliary display module 15 loads the programs stored in the external recording medium 23 into a storage device 22. The computer is controlled by the loaded programs, thereby realizing the function of retrieving and displaying a German-language dictionary explained in the embodiment, which enables the same processes in the aforementioned methods to be performed. The invention can be applied to not only German but also other languages that represent compound words by connecting a plurality of words.

Furthermore, the data of the programs which realize the above methods can be transferred in the form of program code over a network N. The program data can be loaded by a communication module 25 into the computer of the electronic device with the main display module 16 and auxiliary display module 15 connected to the network N, thereby realizing the function of retrieving and displaying a German-language dictionary.

Additional advantages and modifications will readily occur to those skilled in the art. Therefore, the invention in its broader aspects is not limited to the specific details, representative embodiments shown and described herein. Accordingly, various modifications may be made without departing from the spirit or scope of the general inventive concept as defined by the appended claims and their equivalents.

What is claimed is:

1. An electronic dictionary device comprising:
    a display module including a first and a second display screen;
    a dictionary storage module which stores dictionary data that causes a plurality of entry words including compound words obtained by connecting a plurality of words to correspond to explanatory information on the entry words; and a processor which implements processes comprising:
- a common word list display process of retrieving entry words for compound words from the entry words in the dictionary data stored in the dictionary storage module, listing words common to the retrieved compound words, and displaying the listed words on the first display screen;
- a compound word list display process of reading, from the dictionary data, entry words for compound words connecting with a word specified by a user operation in a list displayed by the common word list display process, and displaying the entry words for the compound words connecting with the word specified by the user operation in list form on the second display screen; and
- an explanatory information display process of reading a corresponding piece of explanatory information from the dictionary data when a compound word has been specified according to a user operation in a compound word list displayed by the compound word list display process, and displaying the corresponding piece of explanatory information on the second display screen.

2. The electronic dictionary device of claim 1, wherein the first display screen and the second display screen comprise separate display devices.

3. The electronic dictionary device of claim 2, further comprising a character input module which inputs a search character;
- wherein the processor further implements an entry word list display process of creating an entry word list based on the dictionary data when the character input module has input a search character and displaying the entry word list on the second display screen, and
- wherein the common word list display process displays a list of common words on the first display screen when the entry word list display process displays an entry word list on the second display screen.

4. The electronic dictionary device of claim 3, wherein the processor, in the common word list display process:
- specifies, one by one, entry words in the entry word list displayed by the entry word list display process, starting with a first word, and determines whether the specified entry word prefix-matches a next entry word; and
- regards the specified word as a common word when the processor has determined that the specified entry word prefix-matches the next entry word, and enters the specified word.

5. The electronic dictionary device of claim 4, wherein dictionary data comprises German-language dictionary data that stores entry words for German, and the common word is a prescriptive word of a compound word.

6. The electronic dictionary device of claim 5, wherein the electronic dictionary device is configured such that a first case associated with the first display screen and a keyboard and a second case associated with the second display screen are coupled with each other so as to be openable and closable.

7. A dictionary data display method of an electronic dictionary device which includes (i) a display module including a first and a second display screen, (ii) a dictionary storage module that stores dictionary data that causes a plurality of entry words including compound words obtained by connecting a plurality of words to correspond to explanatory information on the entry words, and (iii) a processor, the dictionary data display method being implemented by the processor, and the method comprising:
- retrieving entry words for compound words from the entry words in the dictionary data stored in the dictionary storage module, listing words common to the retrieved compound words, and displaying the listed words on the first display screen;
- reading, from the dictionary data, entry words for compound words connecting with a word specified by a user operation in a list displayed on the first display screen and displaying the entry words for the compound words connecting with the word specified by the user operation in list form on the second display screen; and
- reading a corresponding piece of explanatory information from the dictionary data when a compound word has been specified according to a user operation in a compound word list displayed on the second display screen and displaying the corresponding piece of explanatory information on the second display screen.

8. The dictionary data display method of claim 7, wherein the first display screen and the second display screen comprise separate display devices.

9. The dictionary data display method of claim 8, further comprising:
- accepting an input of a search character; and
- creating an entry word list based on the dictionary data when a search character has been input and displaying the entry word list on the second display screen,
- wherein the common word list display causes a list of common words to be displayed on the first display screen when the entry word list display has caused an entry word list to be displayed on the second display screen.

10. The dictionary data display method of claim 9, wherein the common word list display includes:
- specifying, one by one, entry words in the entry word list displayed in the entry word list display, starting with a first word, and determining whether the specified entry word prefix-matches a next entry word, and
- regarding the specified word as a common word when it has been determined that the specified entry word prefix-matches the next entry word, and entering the specified word.

11. The dictionary data display method of claim 10, wherein the dictionary data comprises German-language dictionary data that stores entry words for German, and the common word is a prescriptive word of a compound word.

12. A non-transitory recording medium having a program stored thereon that is executable by a processor of an electronic dictionary device to perform processing, the electronic dictionary device further comprising a display module including a first and a second display screen and a dictionary storage module that stores dictionary data that causes a plurality of entry words including compound words obtained by connecting a plurality of words to correspond to explanatory information on the entry words, and the program being executable to control the processor to:
- retrieve entry words for compound words from the entry words in the dictionary data stored in the dictionary storage module, list words common to the retrieved compound words, and display the listed words on the first display screen;
- read, from the dictionary data, entry words for compound words connecting with a word specified by a user operation in a list displayed on the first display screen and display the entry words for the compound words connecting with the word specified by the user operation in list form on the second display screen; and read a corresponding piece of explanatory information from the dictionary data when a compound word has been specified according to a user operation in a compound word list displayed on the second display screen and display the corresponding piece of explanatory information on the second display screen.

13. The non-transitory recording medium of claim 12, wherein the first display screen and the second display screen comprise separate display devices.

14. The non-transitory recording medium of claim 13, wherein the program is executable to further control the computer to:
 accept an input of a search character; and
 create an entry word list based on the dictionary data when a search character has been input and display the entry word list on the second display screen, and
 wherein the common word list display process causes a list of common words to be displayed on the first display screen when the entry word list display process has caused an entry word list to be displayed on the second display screen.

15. The non-transitory recording medium of claim 14, wherein the common word list display process includes:
 specifying, one by one, entry words in the entry word list displayed in the entry word list display process, starting with a first word, and determining whether the specified entry word prefix-matches a next entry word, and
 regarding the specified word as a common word when it has been determined that the specified entry word prefix-matches the next entry word, and entering the specified word.

16. The non-transitory recording medium of claim 15, wherein the dictionary data comprises German-language dictionary data that stores entry words for German, and the common word is a prescriptive word of a compound word.

* * * * *